United States Patent
Arbel et al.

(10) Patent No.: US 12,541,325 B2
(45) Date of Patent: Feb. 3, 2026

(54) MEMORY CONTROLLER WITH A PREPROCESSOR

(71) Applicant: XILINX, INC., San Jose, CA (US)

(72) Inventors: Ygal Arbel, Morgan Hill, CA (US);
Martin Newman, Saratoga, CA (US);
Arul Chinnappan, Fremont, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/865,157

(22) Filed: Jul. 14, 2022

(65) Prior Publication Data

US 2024/0020058 A1    Jan. 18, 2024

(51) Int. Cl.
*G06F 3/06*       (2006.01)
*G06F 9/38*       (2018.01)
*G06F 13/16*      (2006.01)

(52) U.S. Cl.
CPC .......... *G06F 3/0659* (2013.01); *G06F 3/0611* (2013.01); *G06F 3/0673* (2013.01); *G06F 9/3856* (2023.08)

(58) Field of Classification Search
CPC .... G06F 3/0659; G06F 3/0611; G06F 3/0673; G06F 9/3856
USPC .......................................................... 711/154
See application file for complete search history.

(56) References Cited

U.S. PATENT DOCUMENTS

| | | | |
|---|---|---|---|
| 2009/0016137 A1* | 1/2009 | Hur ..................... | G06F 13/1626 365/226 |
| 2009/0150624 A1* | 6/2009 | Resnick ................ | G06F 9/3004 711/155 |
| 2011/0016278 A1* | 1/2011 | Ware .................... | G11C 7/1072 711/E12.001 |
| 2011/0179200 A1* | 7/2011 | Sukonik .............. | G06F 13/1642 710/53 |
| 2013/0212330 A1* | 8/2013 | Brittain ............... | G06F 13/1626 711/E12.001 |
| 2014/0095907 A1* | 4/2014 | Nguyen Tien ........ | G06F 1/3209 713/320 |
| 2014/0365705 A1* | 12/2014 | Tanaka .................. | G06F 13/362 710/308 |
| 2017/0060788 A1* | 3/2017 | Chang ................. | G06F 13/1668 |
| 2017/0068451 A1* | 3/2017 | Kenan .................. | G06F 3/0659 |
| 2021/0200694 A1* | 7/2021 | Magro ................ | G06F 12/0882 |

* cited by examiner

*Primary Examiner* — Arpan P. Savla
*Assistant Examiner* — Sidney Li
(74) *Attorney, Agent, or Firm* — Patterson + Sheridan, LLP

(57) ABSTRACT

A state-of-the-art memory controller and methods for using the same are disclosed. The memory controller is intended for use with dynamic random-access memory (DRAM) circuitry. In one example, a memory controller includes a reordering preprocessor circuitry coupled to a reordering scheduler circuitry. The reordering scheduler circuitry is configured to control a reordering scheduler queue, and is coupled to DRAM circuitry. The reordering preprocessor circuitry is configured to control a preprocessor queue and reorder transactions in the preprocessor queue so as to increase the DRAM circuitry performance.

20 Claims, 9 Drawing Sheets

MEMORY CONTROLLER WITH A PREPROCESSOR

TECHNICAL FIELD

Examples of the present disclosure generally relate to dynamic random access memory (DRAM) controllers, and in particular, to preprocessor circuitry and methods for a DRAM controller.

BACKGROUND

Dynamic Random Access Memory (DRAM) controllers may use a common architecture using a reordering scheduler that includes a transaction queue/content addressable memory (CAM). The reordering scheduler queue/CAM is a complex data structure and usually becomes the bottleneck to register transfer level (RTL) timing closure. The achievable DRAM performance or efficiency increases with increasing queue depth, but queue size is usually limited by RTL timing closure considerations.

For a HBM3 (High Bandwidth Memory 3) controller development, a desirable performance target might require a 128-deep transaction queue, with an operating speed at 1 GHz (i.e. for 8 Gbps data rates). Achieving 1 GHz operation presents a significant challenge with the current architecture.

Thus, there is a need for an improved DRAM controller architecture.

SUMMARY

Disclosed herein is a memory controller and methods for using the same. The memory controller is intended for use with dynamic random-access memory (DRAM) circuitry. In one example, a memory controller includes a reordering preprocessor circuitry coupled to a reordering scheduler circuitry. The reordering scheduler circuitry is configured to control a reordering scheduler queue, and is coupled to DRAM circuitry. The reordering preprocessor circuitry is configured to control a preprocessor queue and reorder transactions in the preprocessor queue so as to increase the DRAM circuitry performance.

In another example, a method for controlling DRAM circuitry includes: providing a reordering scheduler circuitry coupled to DRAM circuitry and configured to control a reordering scheduler queue, the reordering scheduler circuitry coupled to a reordering preprocessor circuitry, the reordering preprocessor circuitry configured to control a preprocessor queue; and reordering transactions in the reordering scheduler queue so as to increase the DRAM circuitry performance.

In yet another example, a method for controlling DRAM circuitry includes analyzing incoming memory traffic; detecting if incoming memory traffic is substantially read/write traffic; detecting if incoming memory traffic uses a majority of memory banks; and selecting one optimum preprocessor static mode for a memory controller.

These and other examples may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
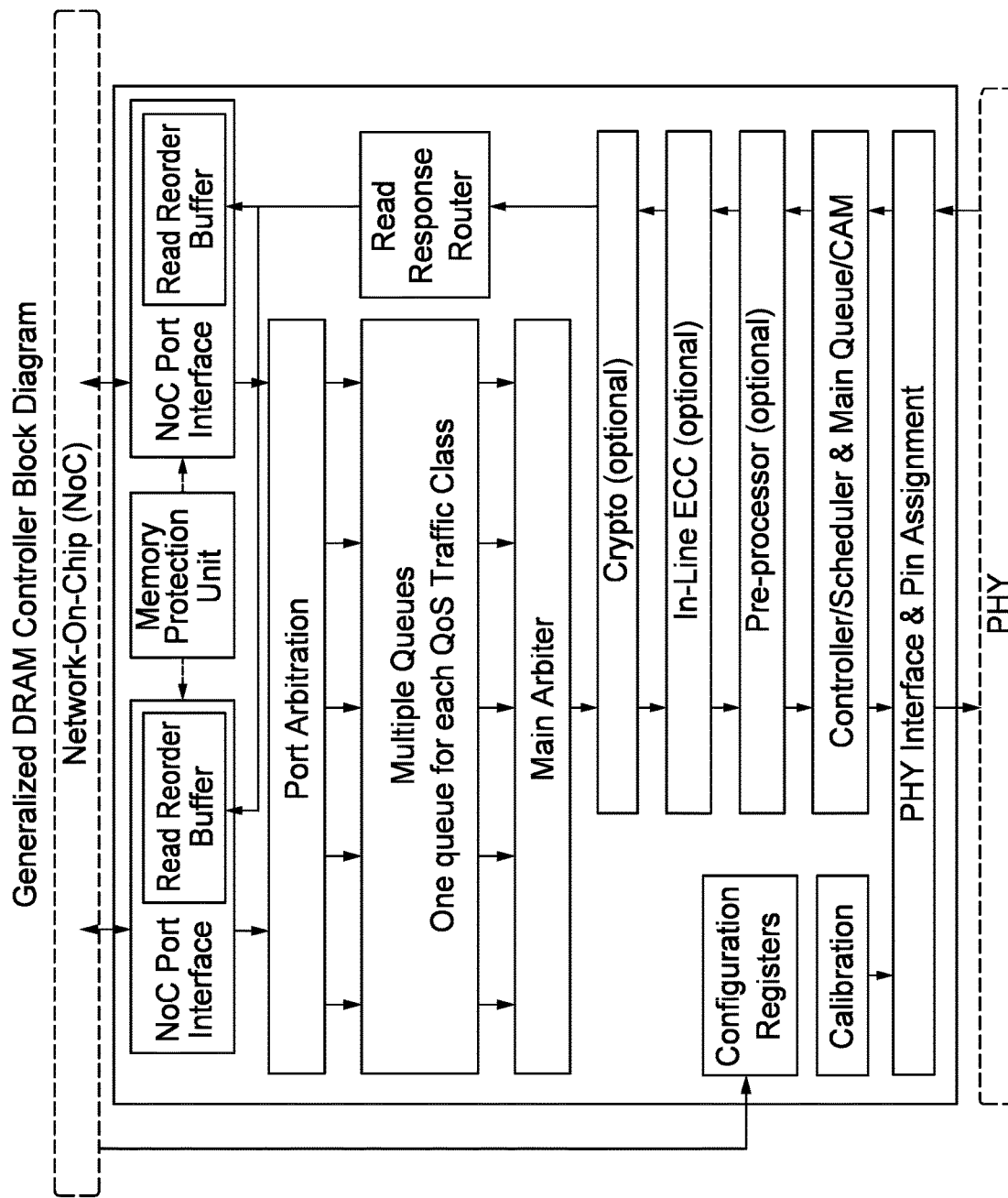
FIG. 1 illustrates a generalized dynamic random access memory (DRAM) controller block diagram, according to one example.

The disclosure here introduces a novel reordering preprocessor architecture in which the reordering scheduler queue depth is reduced, and a separate reordering preprocessor that precedes the memory controller/scheduler, allowing easier design and timing closure, while maintaining or exceeding the same performance targets as traditional controller architecture.

With this approach, higher performance targets are achievable with the same silicon process technology.

The dynamic random access memory (DRAM) controller architecture disclosed herein is suitable for high bandwidth memory (HBM), dynamic data rate 4 (DDR4), and DDR5 type memory controllers, amongst others. The architecture partitions a DRAM controller into a reordering preprocessor (PP) and a reordering scheduler, Each can be independently designed and optimized, and the combination of the two can provide higher performance compared to the memory scheduler alone, or equivalent performance to a scheduler alone with a larger transaction queue.

The architecture disclosed herein uses a shorter reordering (main) scheduler queue/content addressable memory (CAM) that is 64-entry deep, allowing easy timing closure. The memory scheduler module is preceded by a reordering PP module that is largely decoupled from the reordering scheduler and contains an independent transaction queue, which can be sized to match the desired performance targets. In the example below, the PP queue depth is 128, but the queue structure is much simpler than the reordering scheduler queue, allowing easy timing closure at 1 GHz.

Typical state-of-the-art DRAM controller architecture is based on a reordering scheduler using a deep transaction queue or CAM.

As DRAM data transfer speed increases without significant improvements in DRAM timing parameters, DRAM controller schedulers require deeper reordering transaction queues to achieve adequate performance. Some architectures have gone from queue depths of 32 to 48 to 64, and now to 128 and beyond.

With increasing queue depth and increasing clock speeds, it becomes challenging to design the register transfer level (RTL) and close timing at the speed required (1.0 GHz and above).

Disclosed herein is a reordering PP for a DRAM controller. The DRAM is organized into banks and pages. The reordering PP operates as a separate stage prior to the operation of a reordering (main) scheduler. Various memory operations are queued as transactions in both the reordering PP and the reordering scheduler. The reordering preprocessor includes a non-CAM, simple first-in-first-out (FIFO) design that reduces the queue length of the reordering scheduler. Circuitry coupled to the reordering scheduler and also coupled to the reordering preprocessor performs various operations to increase the efficiency of the reordering scheduler queue.

The basic reordering PP operation includes the following operations.

1. If there is room in the reordering scheduler queue, remove one transaction from the front of the reordering PP queue and insert that transaction into the back of the reordering scheduler queue.
2. If there is a pending transaction at the reordering PP input, insert that transaction into the back of the reordering PP queue.
3. The reordering PP queue operates by default as a FIFO with transactions flowing from input to the reordering scheduler queue. If the reordering PP queue is not empty, the reordering PP looks for one transaction in the reordering PP queue that is a preferred candidate for reordering, i.e. a transaction moving to the front of the reordering PP queue. If such a transaction is found, it is moved to the front of the reordering PP queue.
4. The reordering PP has several modes, each using a different reordering criterion. The reordering PP mode can be programmed to operate in static mode, or dynamic mode. When in dynamic mode, the reordering PP performs traffic analysis and classification and picks the mode that substantially matches the detected traffic pattern.
5. If the reordering PP is disabled, the reordering PP queue acts as a simple FIFO in front of the reordering scheduler queue, or else the reordering PP queue can be bypassed. The reordering scheduler has no visibility into the reordering PP queue and vice versa. This 'divide and conquer' separation simplifies the design and timing closure.

The following reordering PP static modes are provided:

PP mode 1: In this mode, the reordering PP performs reordering to increase the bank cycle time (sequential bank) and decrease the page miss overhead.

PP mode 2: In this mode, the reordering PP performs reordering to improve the page hit rate.

PP mode 4: In this mode, the reordering PP performs reordering to improve read/write grouping and increase average group size, thus decreasing performance loss during read-write bus turnaround.

PP mode 12: This mode is a variant of PP mode 2 which is bank-group-optimized, i.e., the reordering PP alternates between bank groups to improve efficiency.

Table I below summarizes simulation results of the different PP static modes. Values are in percent units of achieved average efficiency delta relative to a prior-art architecture using a 128-deep reordering scheduler queue and no preprocessor.

TABLE I

| Test | PP1_SeqB | PP2_PgHit | PP12_PHo | PP4_RdWr |
|---|---|---|---|---|
| RND_RO | +0.94 | −0.41 | −0.31 | −0.31 |
| RND_WO | +1.39 | −0.72 | −0.72 | −0.72 |
| RND_RW | +2.00 | −2.99 | −2.85 | +6.95 |
| LIN_RO | −1.0 | +5.88 | +5.89 | 0 |
| LIN_WO | −0.91 | +10.39 | +10.41 | 0 |
| LIN_RW | −2.42 | −3.16 | +0.5 | −2.25 |
| RNB_RO | +1.46 | −2.69 | −0.65 | −0.81 |
| RNB_WO | −0.57 | +0.79 | +0.71 | −1.43 |
| RNB_RW | −1.89 | −2.36 | +0.22 | +8.23 |
| Overall | −0.43 | +0.16 | +1.40 | +1.09 |

From these results, it is evident that different modes are optimal for different traffic patterns. For example, PP mode 1 is optimal for random (RND) and random block (RNB) unidirectional traffic (i.e. with RO=read only or WO=write only), PP mode 2/12 is optimal for linear (LIN) unidirectional, and PP mode 4 is optimal for some mixed read-write (RW) patterns.

It is therefore desirable to match the reordering PP mode to the traffic pattern. If the pattern is known based on the use case, the pattern can be statically selected. Alternatively, the reordering PP architecture includes an adaptive/dynamic PP mode, which analyzes and classifies the traffic pattern in real time and chooses the most optimal PP mode to match the current traffic pattern, and dynamically tracks traffic pattern changes as they occur.

Table II below summarizes PP mode 8 simulation results.

The adaptive mode, named here PP mode 8, therefore achieves robust performance by choosing a PP static mode for each traffic pattern.

As evident, with this novel architecture and with PP mode 8, a performance target can be exceeded by an average 3.77% while meeting RTL timing closure goal of 1 GHz.

TABLE II

| Test | PP8 | PP1_SeqB | PP2_PgHit | PP12_PHo | PP4_RdWr |
|---|---|---|---|---|---|
| RND_RO | +0.94 | +0.94 | −0.41 | −0.31 | −0.31 |
| RND_WO | +1.38 | +1.39 | −0.72 | −0.72 | −0.72 |
| RND_RW | +6.93 | +2.00 | −2.99 | −2.85 | +6.95 |
| LIN_RO | +5.89 | −1.0 | +5.88 | +5.89 | 0 |
| LIN_WO | +10.41 | −0.91 | +10.39 | +10.41 | 0 |
| LIN_RW | +2.42 | −2.42 | −3.16 | +0.5 | −2.25 |
| RNB_RO | +1.55 | +1.46 | −2.69 | −0.65 | −0.81 |
| RNB_WO | −0.22 | −0.57 | +0.79 | +0.71 | −1.43 |
| RNB_RW | +7.64 | −1.89 | −2.36 | +0.22 | +8.23 |
| Overall | +3.77 | −0.43 | +0.16 | +1.40 | +1.09 |

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the invention or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Figure 2:
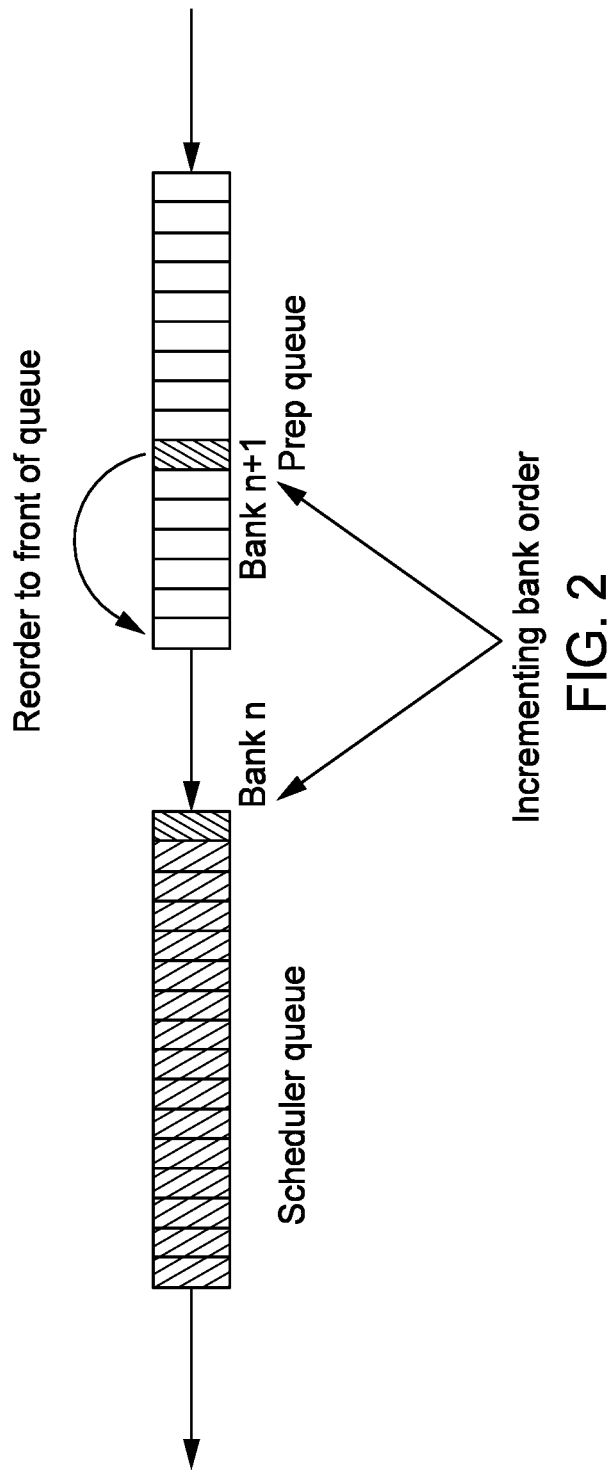
FIG. 2 illustrates a scheduler queue and preprocessor mode 1 queue, according to one example.
Figure 4:
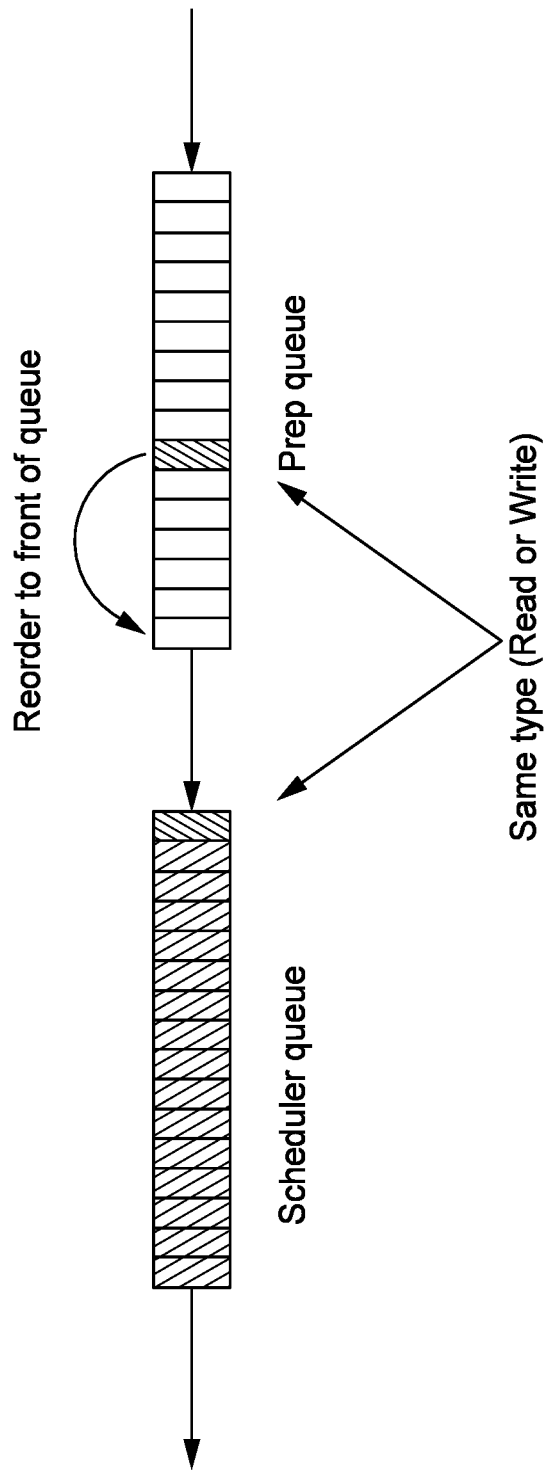
FIG. 4 illustrates a scheduler queue and preprocessor mode 4 queue, according to one example.
Figure 6:
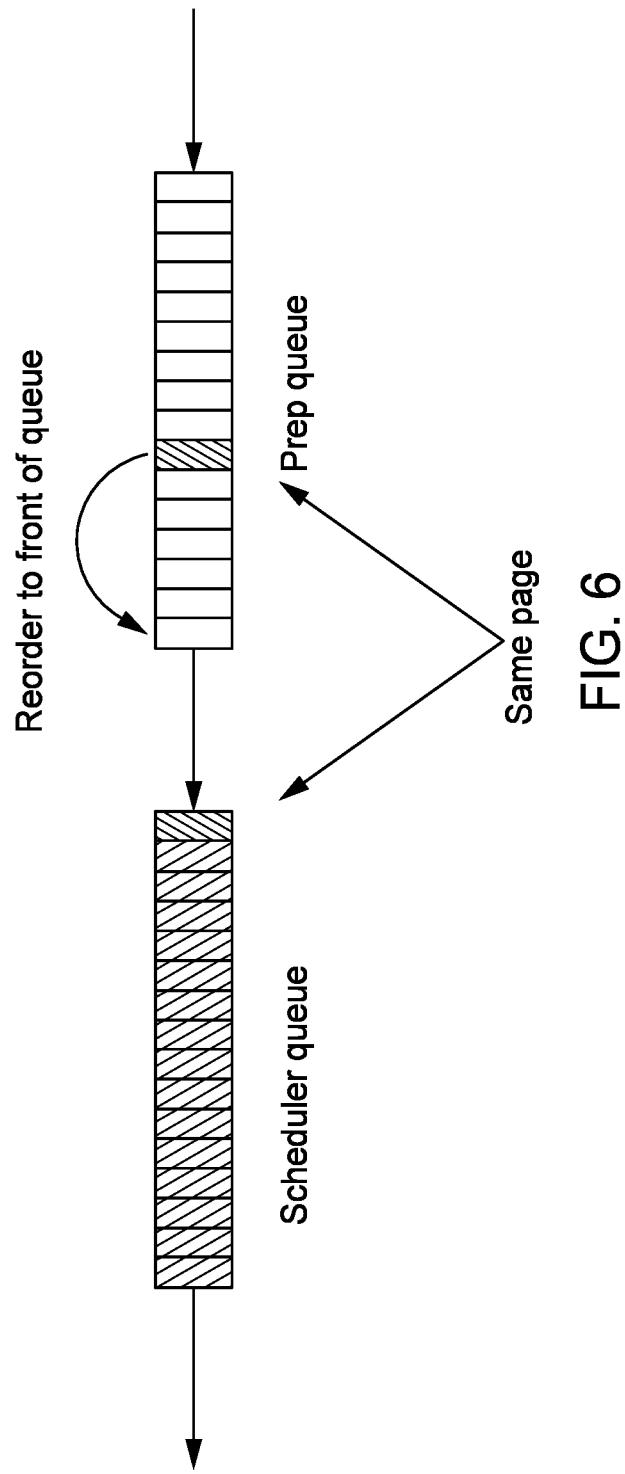
FIG. 6 illustrates a scheduler queue and preprocessor mode 2/mode 12 queues, according to one example.

FIGS. 2, 4, and 6 illustrate various scheduler and preprocessor (PP) queues. In the queues shown in FIGS. 2, 4 and 6, transactions flow from right to left as indicated by the black horizontal arrows, so the front of either queue is on its left. Newer transactions enter on the right side of the queues, and older transactions (unless reordered) exit on the left side of the queues. Thus, the front of the prep queue is feeding the back of the scheduler queue.

In the queues shown in FIGS. 2, 4 and 6, preprocessor reordering occurs within the prep queue. In the figures, the curved arrow above the prep queues indicates that the reordering consists of moving a chosen transaction to the front of a prep queue. Independent of this reordering, whenever there is room in the scheduler queue, the transaction at the front of the prep queue is removed and then inserted into back of the scheduler queue. As a result, a reordering within the prep queue ensures that a chosen transaction within the prep queue will then be the first to reach the scheduler queue.

FIG. 1 illustrates a generalized DRAM controller block diagram, according to one example.

In the DRAM controller, network-on-chip (NoC) circuitry receives and transmits data to and from the NoC port interfaces. A port arbitration circuitry receives and transmits data to and from multiple queues, which receive and transmit data to a main arbiter. Optional crypto circuitry and in-line ECC (error correction code) circuitry receive and transmit data to and from a reordering PP circuitry.

The reordering PP is coupled to a controller/scheduler and main queue/CAM circuitry. The reordering PP reorders transactions only within its own preprocessor queue as described in the following figures. The resulting reordering within the PP queue ensures that a chosen transaction within the PP queue will then be the first to reach the main scheduler queue.

The controller/scheduler and main queue/CAM transmit and receive data to and from a physical (PHY) Interface. The controller/scheduler is also referred to as the main scheduler. When the reordering PP is operative, the main scheduler retains its capabilities, which include reordering transactions and scheduling them based on DRAM state and timing parameters. The main scheduler contains circuitry that performs reordering within the main queue. The reordering PP functions in addition to the main scheduler, but does not replace any of the main scheduler functions.

FIG. 2 illustrates a scheduler queue and PP mode 1 Queue, according to one example. In mode 1, the reordering PP performs reordering to increase the bank cycle time (sequential bank) and reduce the page miss overhead.

The memory main scheduler queue and the reordering PP queue are illustrated. Transactions in both queues are illustrated as rectangular boxes. The transactions are arranged in sequential bank order to increase the distance between same-bank accesses, i.e., allow as much time as possible to pre-charge & activate the bank's next page. In some examples, increasing the distance between same-bank accesses involves maximizing the distance between same bank accesses.

Figure 3:
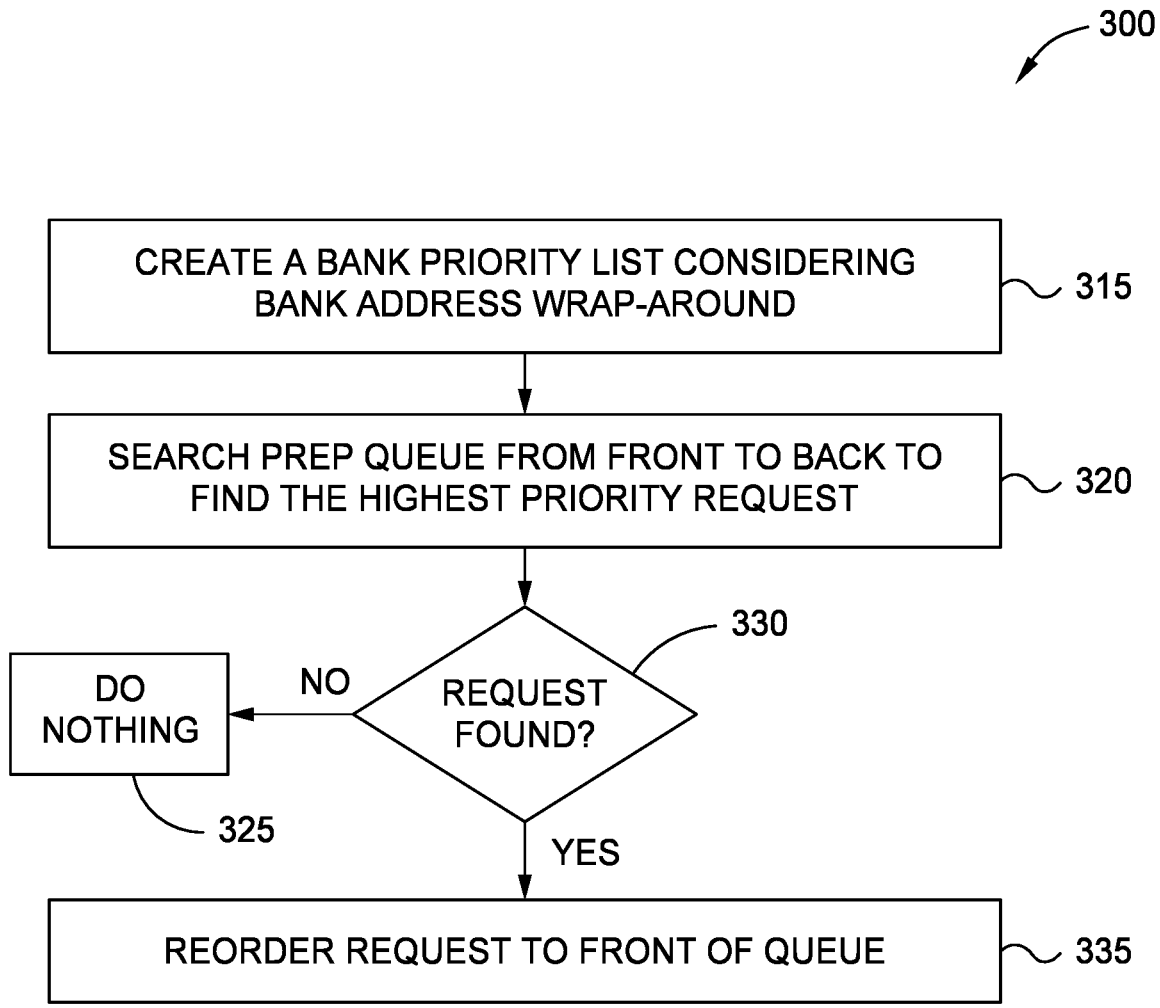
FIG. 3 illustrates a preprocessor mode 1 process, according to one example.

FIG. 3 illustrates a PP mode 1 process 300, according to one example. This is a sequential bank process.

The assumptions made in this process include: There are a total of N memory banks and the last bank sent out is bank K. N and K are integer numbers dependent on the memory configuration.

The process 300 begins at operation 315 by creating a bank priority list. The desired next bank in priority order from high to low is:

[K+1, K+2, . . . N−1, 0, 1, . . . K−1]

At operation 320, the process 300 searches the reordering PP queue from front to back to find the highest priority request (i.e., the leftmost bank in the priority list), i.e., if K+1 is not found, then find K+2, then find K+3, etc.

At operation 330 the process 300 determines if the highest priority bank is found. If the highest priority bank is found, then the highest priority bank is reordered to the front of the PP queue in operation 335.

If the highest priority bank is not found, then the process 300 does nothing at operation 325.

FIG. 4 illustrates a scheduler queue and PP mode 4 queue, according to one example. PP mode 4 is a read-write group size maximization process. The memory main scheduler queue and the reordering PP queue are illustrated. When the controller switches between read and write, there is bus overhead. The goal is to decrease (in some examples, minimize) switching between reads and writes using the reordering preprocessor (PP). The effect of the process is to decrease (inn some examples, minimize) bus turnaround overhead, while the reordering PP queue can double the length of the read/write groups relative to the 64-deep main queue alone.

Figure 5:
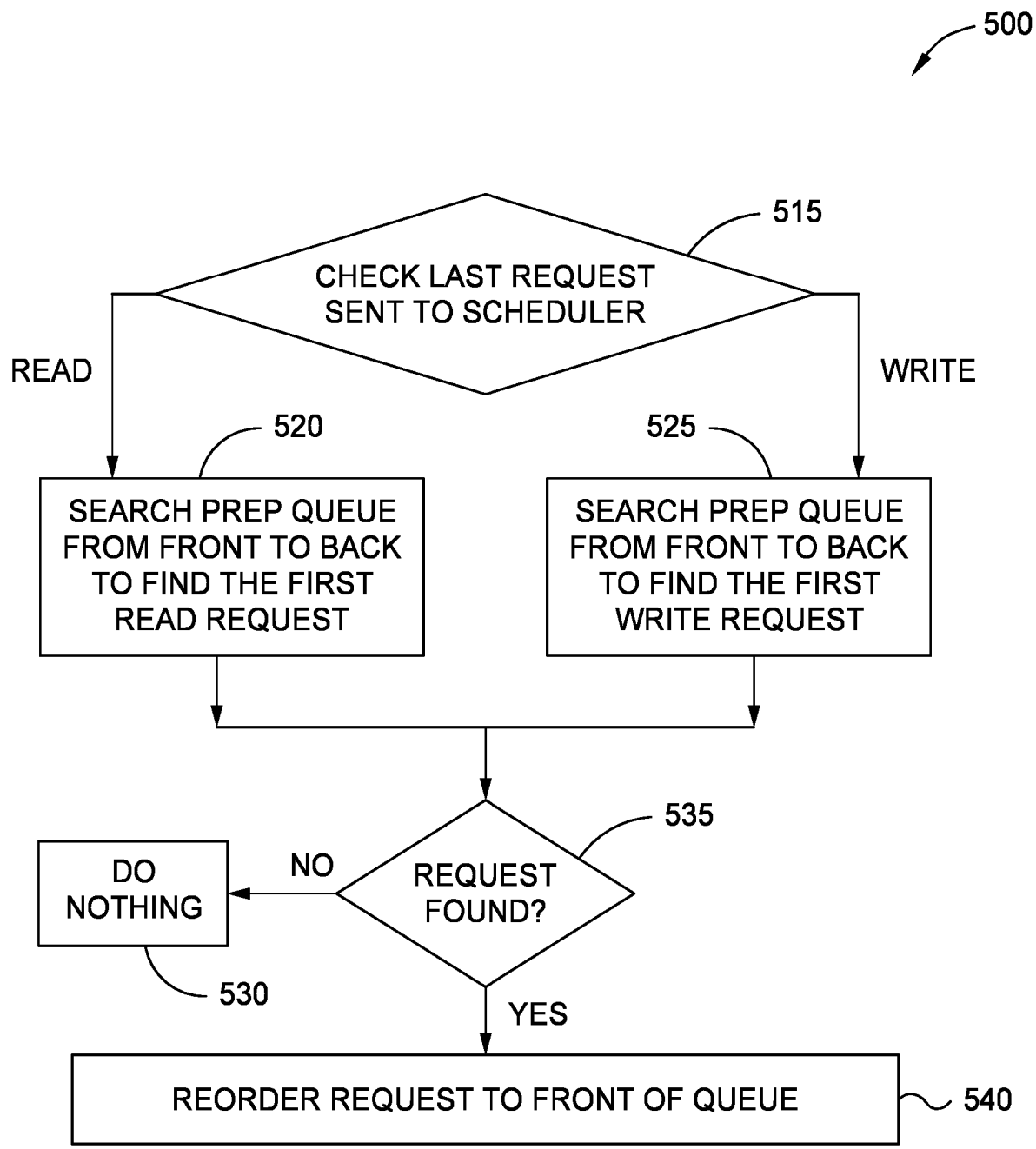
FIG. 5 illustrates a preprocessor mode 4 process, according to one example.

FIG. 5 illustrates a PP mode 4 process 500, according to one example.

In operation 515, the process determines if the last request sent to the reordering scheduler was a read or write process.

In operations 520 and 525, the process searches the reordering PP queue from front to back to find the first request of the same type (i.e. a read type request or a write type request) as the last request sent to the reordering scheduler. If that request is found (operation 535), the process reorders it to the front of the PP queue (operation 540).

If the request is not found, the process does nothing (operation 530).

FIG. 6 illustrates a scheduler queue and PP mode 2/mode 12 queue, according to one example. The memory main scheduler queue and the reordering PP queue are illustrated.

In Mode 2, the reordering PP performs reordering to improve the page hit rate. PP mode 12 is a variant of PP mode 2 which is bank-group-optimized, i.e., the reordering PP alternates between bank groups to improve efficiency.

PP mode 2/mode 12 PP2/PP12 achieves page hit maximization by arranging transactions for the same bank page hits. In PP mode 12, a bank-group optimization (BGO) aware variant alternates even/odd banks, based on the convention of bank group bits being the least significant bit (LSB) of the bank bits. Each address is mapped to a bank group. BG0 is use in the address mapping process to ensure that the controller uses different bank groups.

Figure 7:
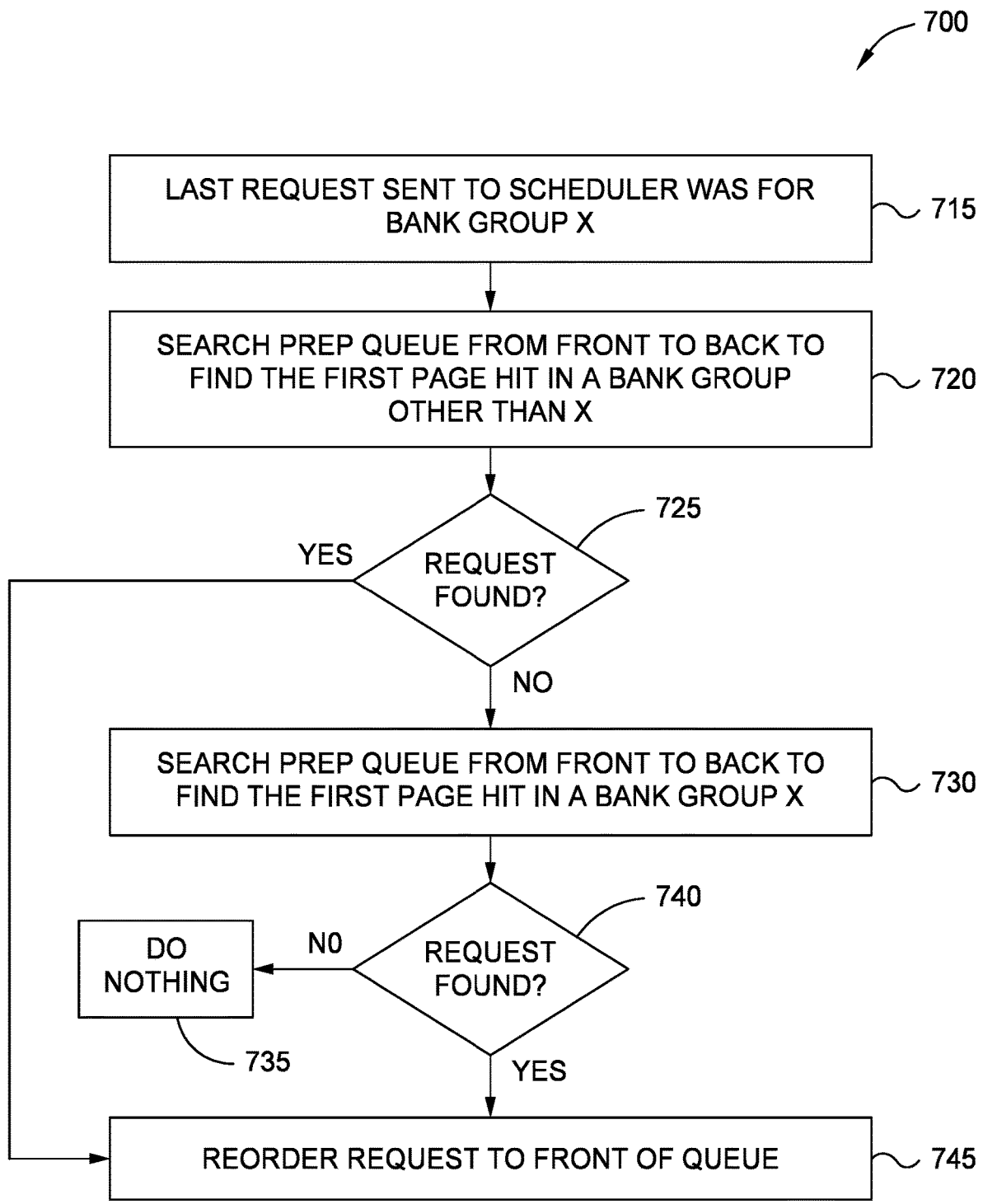
FIG. 7 illustrates a preprocessor mode 12 process, according to one example.

FIG. 7 illustrates a PP mode 12 process, according to one example. PP mode 12 is a BGO-aware page hit maximization algorithm.

In operation 715, the last request sent to the reordering scheduler was for bank group X.

The process searches the reordering PP queue from front to back to find the first request with a page hit in a bank group other than bank group X (operation 720).

If that request is found (operation 725), then that request is reordered to the front of the PP queue in operation 745.

If that request is not found, then the process searches for the first page hit in bank group X (operation 730). In some examples, operation 730 may be optional or less than optimal.

If that request is found (operation 740) then, that request is reordered to the front of the PP queue (operation 745).

If that request is not found, then the process does nothing (operation 735).

To determine the page hit, the preprocessor maintains the state of the last requested row in each bank from the commands sent to the reordering scheduler so far.

Figure 8:
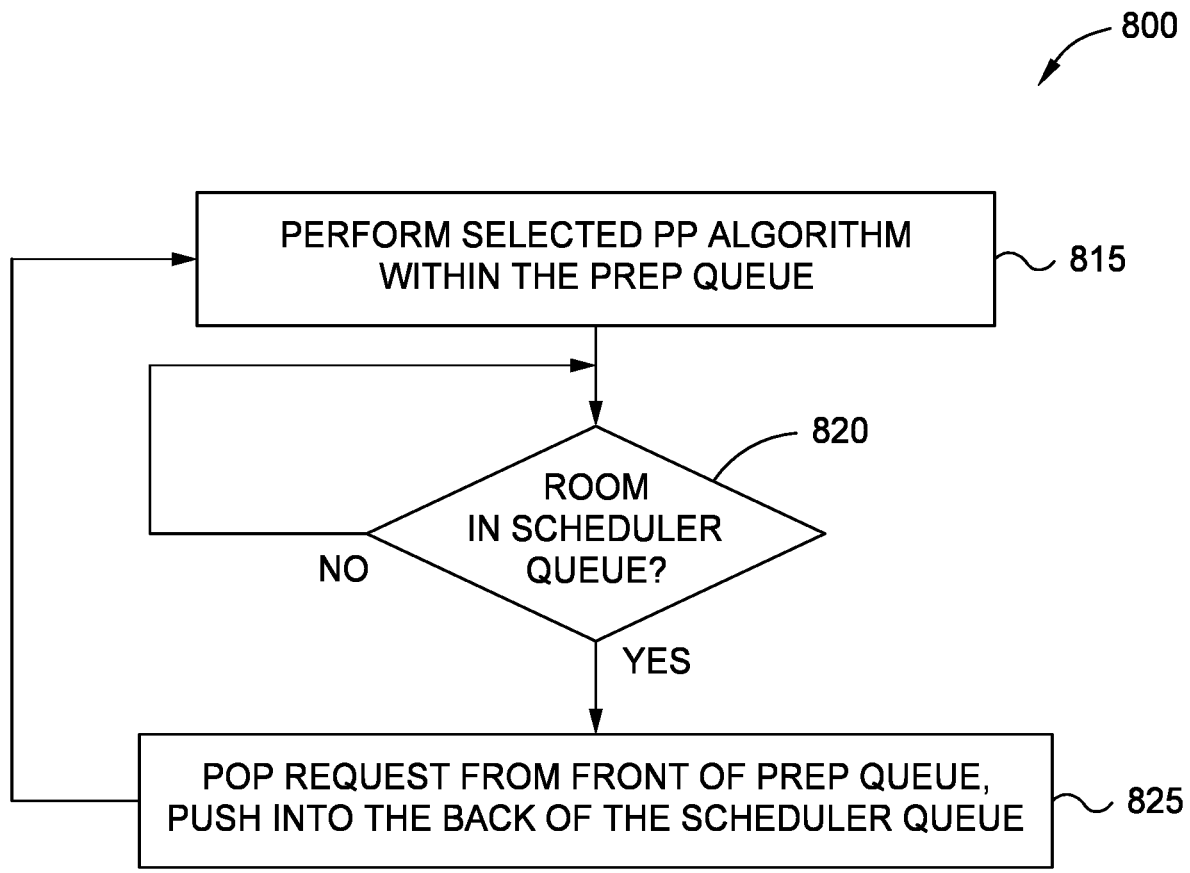
FIG. 8 illustrates an overall preprocessor process, according to one example.

FIG. 8 illustrates an overall PP process, according to one example.

In operation 815, the process performs the selected PP algorithm within the prep queue. In operation 820, the process checks if there is room in the reordering scheduler queue. If so, the process continues at operation 825 where a request is removed from the front of the PP queue and inserted into the back of the reordering scheduler queue. The process then continues at operation 815.

If there is not room in the reordering scheduler queue, the process returns to operation 820.

Figure 9:
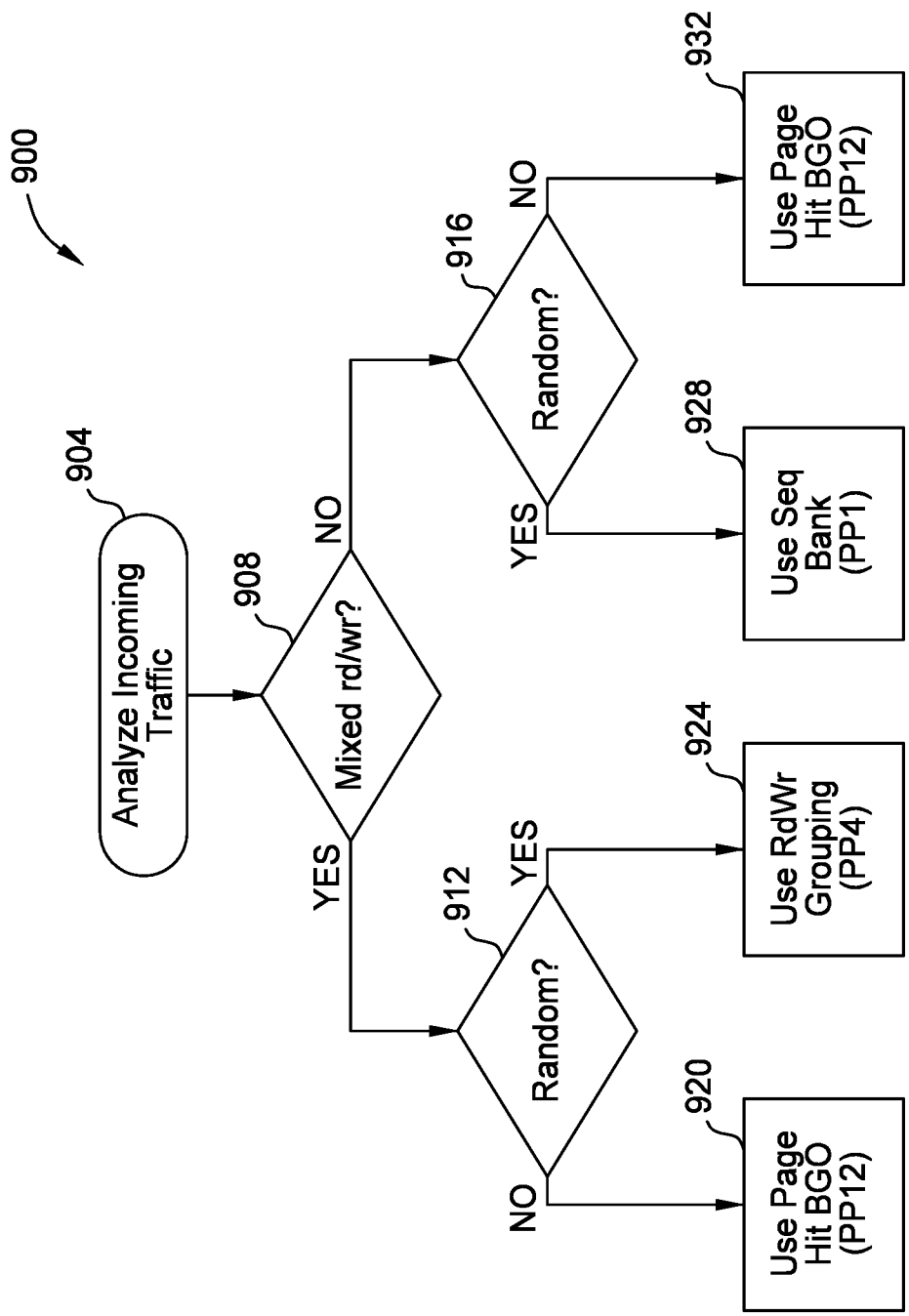
FIG. 9 illustrates an adaptive model preprocessor mode 8 process, according to one example.

FIG. 9 illustrates an adaptive model PP mode 8 process, according to one example. The process 900 begins at step 904 where incoming traffic is analyzed.

Incoming memory traffic is not mixed read/write when the majority of the traffic is read only or write only, meaning that writes are less than 25% or writes are more than 75%. Otherwise the incoming memory traffic is considered mixed read/write.

Incoming memory traffic is considered "random" when half or more of the memory banks are being used. Otherwise the incoming memory traffic is considered not random.

At step 908, if the incoming memory traffic is mixed read/write traffic, the process 900 at continues at step 912. At step 912, if the incoming memory controller traffic is not random, the process 900 continues at step 920 and selects page hit BGO mode (PP12). At step 912, if the incoming memory controller traffic is random, the process 900 continues at step 924 and selects read/write grouping mode (PP4).

At step 908, if the incoming memory traffic is not mixed read/write traffic, the process 900 continues at step 916. At step 916, if the incoming memory controller traffic is random, the process 900 continues at step 928 and selects sequential bank mode (PP1). At step 912, if the incoming memory controller traffic is not random, the process 900 continues at step 932 and selects page hit BGO mode (PP12).

The methods disclosed herein comprise one or more operations or actions for achieving the methods. The method operations and/or actions may be interchanged with one another. In other words, unless a specific order of operations or actions is specified, the order and/or use of specific operations and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-b, a-c, b-b, b-b-b, b-b-c, c-c, and c-c-c, or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "operation for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to specific examples, other and further examples may be devised without departing from the basic scope thereof, and the scope thereof is determined by the claims that follow.

What is claimed is:

1. A memory controller, comprising:
   a reordering scheduler circuitry configured to control a single reordering scheduler queue having a first queue structure with a first depth, and coupled to dynamic random-access memory (DRAM) circuitry; and
   a reordering preprocessor circuitry coupled to the reordering scheduler circuitry, and physically and logically distinct from the reordering scheduler circuitry, the reordering preprocessor circuitry configured to control a single preprocessor queue having a second queue structure with a second depth and reorder transactions in the preprocessor queue based on traffic patterns operating in multiple reordering modes before reaching the reordering scheduler circuitry, such that the first depth of the reordering scheduler queue is less than the second depth of the preprocessor queue, wherein transactions are transmitted in one direction from the single preprocessor queue having a larger queue depth to the single reordering scheduler queue having a smaller queue depth, the preprocessor queue having a front and a back, wherein a single transaction in the preprocessor queue is first moved to the front of the preprocessor queue, then the single transaction is removed from the front of the preprocessor queue and inserted into a back of the reordering scheduler queue, wherein the reordering modes include at least a first reordering mode configured to perform reordering that increases bank cycle times and decreases page miss overhead, a second reordering mode configured to perform reordering that improves a page hit rate, and a third reordering mode configured to perform reordering that improves read-write grouping and increases average group size.

2. The memory controller of claim 1, wherein the reordering preprocessor circuitry is further configured to:
   arrange the transactions in sequential bank order; and
   increase distance between same bank accesses.

3. The memory controller of claim 1, wherein the reordering preprocessor circuitry is further configured to:
   decrease bus turnaround overhead.

4. The memory controller of claim 1, wherein the reordering preprocessor circuitry is further configured to:
   arrange the transactions for the same bank page hits; and
   increase page hits.

5. The memory controller of claim 1, wherein the reordering preprocessor circuitry is further configured to:
   create a bank priority list;
   search the preprocessor queue to find a highest priority request; and
   reorder the highest priority request to the front of the preprocessor queue.

6. The memory controller of claim 1, wherein the reordering preprocessor circuitry is further configured to:
   determine if a last request sent to the reordering scheduler circuitry was a read type or a write type request;

search the preprocessor queue from front to back to find a first request of the same type as the last request sent to the reordering scheduler circuitry; and if a first request is found, reorder the first request to the front of the preprocessor queue.

7. The memory controller of claim 1, wherein the reordering preprocessor circuitry is further configured to:

determine if a last request sent to the reordering scheduler circuitry was for bank group X;

search the preprocessor queue from front to back to find a first request with a page hit in a bank group other than X; and if a first request is found, reorder the first request to the front of the preprocessor queue.

8. The memory controller of claim 1, wherein the second depth of the preprocessor queue has a 128-entry depth and the first depth of the reordering scheduler queue has a 64-entry depth.

9. The memory controller of claim 1, wherein the reordering preprocessor circuitry is further configured to:

when the reordering preprocessor circuitry is in a dynamic mode, perform traffic analysis and detect traffic patterns; and select a static mode that best matches the detected traffic pattern.

10. The memory controller of claim 1, wherein the reordering preprocessor circuitry precedes the reordering scheduler circuitry and the preprocessor queue is an independent transaction queue that is different from the reordering scheduler queue.

11. A method for controlling dynamic random-access memory (DRAM) circuitry, comprising:

providing a reordering scheduler circuitry coupled to DRAM circuitry and configured to control a single reordering scheduler queue having a first queue structure with a first depth, the reordering scheduler circuitry coupled to a reordering preprocessor circuitry, and physically and logically distinct from the reordering scheduler circuitry, the reordering preprocessor circuitry configured to control a single preprocessor queue having a second queue structure with a second depth; and reordering transactions in the reordering scheduler queue based on traffic patterns operating in multiple reordering modes before reaching the reordering scheduler circuitry, such that the first depth of the reordering scheduler queue is less than the second depth of the preprocessor queue, wherein transactions are transmitted in one direction from the single preprocessor queue having a larger queue depth to the single reordering scheduler queue having a smaller queue depth, the preprocessor queue having a front and a back, wherein a single transaction in the preprocessor queue is first moved to the front of the preprocessor queue, then the single transaction is removed from the front of the preprocessor queue and inserted into a back of the reordering scheduler queue, wherein the reordering modes include at least a first reordering mode configured to perform reordering that increases bank cycle times and decreases page miss overhead, a second reordering mode configured to perform reordering that improves a page hit rate, and a third reordering mode configured to perform reordering that improves read-write grouping and increases average group size.

12. The method of claim 11, further comprising:
arranging the transactions in sequential bank order; and
increasing distance between same bank accesses.

13. The method of claim 11, further comprising:
decreasing bus turnaround overhead.

14. The method of claim 11, further comprising:
arranging the transactions for same bank page hits; and
increasing page hits.

15. The method of claim 11, further comprising:
creating a bank priority list;
searching the preprocessor queue to find a highest priority request; and
reordering the highest priority request to the front of the preprocessor queue.

16. The method of claim 11, further comprising:
detecting if the last request sent to the reordering scheduler circuitry was a read type request or a write type request;
searching the preprocessor queue from front to back to find a first request of the same type as the last request sent to the reordering scheduler circuitry; and
reordering the first request to the front of the reordering preprocessor queue if the first request is found.

17. The method of claim 11, further comprising:
detecting if the last request sent to the reordering scheduler circuitry was for bank group X;
searching the preprocessor queue from front to back to find a first request with a page hit in a bank group other than group X; and
reordering the first request to the front of the reordering preprocessor queue, if the first request is found.

18. The method of claim 11, further comprising:
detecting if room exists in the reordering scheduler queue;
removing one transaction from the front of the preprocessor queue and inserting the removed one transaction to the back of the reordering scheduler queue;
inserting one transaction into the back of the preprocessor queue when there is a pending transaction at the reordering preprocessor circuitry; and
locating one preferred transaction in the preprocessor queue and moving the one preferred transaction to the front of the preprocessor queue.

19. The method of claim 11, further comprising:
when the reordering preprocessor circuitry is in a dynamic mode, performing traffic analysis and detecting traffic patterns; and
selecting a static mode that best matches a detected traffic pattern.

20. The method of claim 11, wherein the reordering preprocessor circuitry precedes the reordering scheduler circuitry and the preprocessor queue is an independent transaction queue that is different from the reordering scheduler queue.

* * * * *